United States Patent [19]

Brotsky et al.

[11] Patent Number: 4,937,092
[45] Date of Patent: Jun. 26, 1990

[54] INCREASED SHELF LIFE FOR REFRIGERATED FISH

[75] Inventors: Eugene Brotsky, Pittsburgh, Pa.; William E. Swartz, Trumbull, Conn.

[73] Assignee: Rhone-Poulenc Basic Chemicals Co., Shelton, Conn.

[21] Appl. No.: 244,622

[22] Filed: Sep. 12, 1988

Related U.S. Application Data

[63] Continuation of Ser. No. 908,128, Sep. 17, 1986, abandoned, Continuation-in-part of Ser. No. 819,438, Jan. 16, 1986, Pat. No. 4,670,277.

[51] Int. Cl.$^5$ ............................ A23B 4/00; A23L 3/34
[52] U.S. Cl. .................................... 426/643; 426/310; 426/321; 426/652; 426/654
[58] Field of Search ............... 426/643, 652, 332, 310, 426/321, 654

[56] References Cited

U.S. PATENT DOCUMENTS

| 2,513,904 | 6/1945 | Hall | 164/382 |
|---|---|---|---|
| 2,788,281 | 4/1957 | Guadagni | 426/639 |
| 3,036,923 | 5/1962 | Mahon | 99/195 |
| 3,049,428 | 8/1962 | Hopkins et al. | 99/174 |
| 3,113,030 | 8/1960 | Brody | 426/55 |
| 3,298,838 | 5/1963 | Rivera | 426/270 |
| 3,462,278 | 8/1969 | Mahon | 426/541 |
| 3,620,767 | 11/1971 | Swartz | 426/281 |
| 3,681,091 | 8/1972 | Kohl et al. | 426/532 |
| 3,875,313 | 4/1975 | Brotsky | 426/265 |
| 3,875,313 | 4/1975 | Brotsky | 426/265 |
| 4,011,346 | 2/1978 | Ernst | 426/332 |
| 4,075,357 | 2/1978 | Szczesniak et al. | 426/332 |
| 4,221,819 | 9/1980 | Falci et al. | 426/262 |
| 4,293,578 | 10/1981 | Stone | 426/332 |
| 4,394,396 | 7/1983 | Shimp et al. | 426/332 |
| 4,431,679 | 2/1984 | Crawford | 426/332 |
| 4,517,208 | 5/1985 | Crawford | 426/332 |
| 4,543,260 | 9/1985 | Brotsky | 426/266 |
| 4,559,234 | 12/1985 | Rubin et al. | 426/250 |
| 4,670,277 | 6/1987 | Brotsky | 426/265 |

FOREIGN PATENT DOCUMENTS 2345082 10/1977 France .
935413 8/1963 United Kingdom .

OTHER PUBLICATIONS

"Oxidative Rancidity in Cooked Mullett", *Food Technology* 15:318.

*Primary Examiner*—Donald E. Czaja
*Assistant Examiner*—Celine T. Callahan
*Attorney, Agent, or Firm*—Paul J. Juettner

[57] ABSTRACT

Fish fillets, particularly those from high fat fish, can be storage stabilized and yield stabilized by means of a composition containing an alkali metal tripolyphosphate hydrated with lemon juice solids, an alkali metal acid pyrophosphate and an alkali metal sorbate at sorbate levels significantly less than required by prior art and without citric acid.

17 Claims, No Drawings

INCREASED SHELF LIFE FOR REFRIGERATED FISH

This application is a continuation of U.S. Application Ser. No. 908,128, filed Sept. 17, 1986, now abandoned which in turn is a continuation-in-part of U.S. Application Ser. No. 819,438, filed Jan. 16, 1986, now U.S. Pat. No. 4,670,277.

BACKGROUND OF THE INVENTION

Biological spoilage has always been a problem with transporting fresh fish fillets to market. At present, fish, upon being caught in the ocean, are iced or immediately frozen for preservation. Upon delivery to retailers, fish shelf-life is extremely short. Not only is there loss due to spoilage but fish lose weight yield due to drip loss. Fresh fish fillets usually maintain a quality shelf-life of only a few days after cut. Methods are needed to extend the shelf-life both for the benefit of the seller and the buyer. Antibiotics such as chlortetracycline have been used to extend the shelf-life of fish fillets but are no longer allowable in the United States. A blend of fumaric acid and benzoate is available but the composition may not be particularly effective.

The preservation of edible protein as well as yield enhancement is a well studied art which has provided numerous treatment compositions. Each type of protein product, i.e. poultry, fresh meat, eggs, cheese, sausage, shell fish, frozen shrimp and fish, has peculiar biochemical compositions with different types of bacteriological problems, taste problems, and deterioration problems. There are available numerous compositions for increasing preservation and yield which at first blush appear to be similar. However, these compositions are generally useful for only one type of protein. Such compositions are commercially or technically unsuccessful or unacceptable when applied to other types of proteins. The transfer of technology from these areas to fish fillet treatment is seldom possible. For this reason, fish fillets are particularly difficult to preserve and to maintain yield. One of the problems encountered in fish fillet preservation is pH change due to bacterial growth. Since aerobic bacterial growth is prevalent during iced storage, the pH of the fillet tends to rise. This contributes to bacterial growth and flavor problems. High fat containing fish such as catfish, trout, tuna, salmon, halibut and the like are subject to rancidity as well as putrefaction. Low fat fish such as sole, cod, flounder, perch, whitefish and the like, because of their low fat content, are less susceptible to rancidity problems. Rancidity can reduce the shelf-life of the fillets, even before putrefaction. A preservative system must counteract both bacterial growth problems and organoleptic problems. A composition for preservation of shell fish is not per se operable with fish fillet. This is particularly true in the case of fresh fish which are not frozen to increase storage stability. Further, food producers, being subject to various labeling and regulatory restrictions that influence customer reaction, desire to avoid any hint of these restrictions, if possible. The more and varied the ingredients in a composition, the greater the risk of encountering a labeling or regulatory problem. A composition with fewer ingredients can provide the food processor with a clearer labeling requirement picture than a composition of many ingredients.

PRIOR ART DESCRIPTION

The problem of increasing the shelf-life of fish fillets has been outlined in patents to Crawford, U.S. Pat. No. 4,431,679, issued Feb. 14, 1984, and U.S. Pat. No. 4,517,208 issued May 14, 1985. These patents teach that fish fillets can be stabilized by a mixture containing at least two of the following: 14–90% sodium tripolyphosphate STP), 5–50% sodium hexametaphosphate (SHMP), and 0–95% sodium pyrophosphate (SAPP) in combination with from 0.1 to 0.2 part potassium sorbate per part of phosphates (9–16% of the total composition) and citric acid in an amount sufficient to provide a pH within the range of 5.6–6.5. This product is apparently embodied in a commercial product FISH-PLUS TM fish preservative. It would be desirable to achieve a formulation in which the level of sorbate can be reduced as this material is presently many times as expensive as the next most expensive ingredient, citric acid. It would also be desirable to achieve a formulation which did not contain citric acid as this is also an expensive chemical which can add an undesirable taste to the fish fillet.

Shimp. U.S. Pat. No. 4,394,396, issued July 17, 1983, shows a dip used for retaining the natural appearance and preventing weight loss of thawed or cooked shrimp. The dip is composed of an 80:20 to 60:40 ratio of sodium tripolyphosphate to sodium acid pyrophosphate. The pH of the dip is 6.2–7.1. As stated by Crawford, fish fillet are unique from shell fish, and formulations beneficial to one are not necessarily beneficial to the other.

Kohl, U.S. Pat. No. 3,681,091 shows that 1% sodium polyphosphate having an average chain length of 18 was effective in preventing propagation of inoculated *S. aureus* for 3 days in a liquid test media containing ground fish fillet (Example 17). Kohl also discloses blends of polyphosphates having an average chain length of from about 16 to about 100 and an alkali metal sorbate as providing better taste than a preserving amount of sorbate alone (Example 27). Kohl discloses that sodium acid pyrophosphate gave no significant microbial growth inhibitory effect when used alone, and a slight inhibitory effect was shown using a 50:50 blend of sodium acid pyrophosphate and tetrasodium pyrophosphate. Kohl does not show the use of a composition of sodium acid pyrophosphate in combination with sodium tripolyphosphate and a sorbate. The preferred levels of sorbate to polyphosphate of 2:1 to 1:2 in Kohl is an undesirably high level of sorbate. Kohl teaches that the presence of pulpy material may adversely affect the polyphosphate performance.

Sodium tripolyphosphate is known to be a safe additive for foods (see Hall. U.S. Pat. No. 2,513,904, "Curing of Meat to Inhibit Undesirable Color Change"). It has been used to control oxidative changes in foods (see the article by M. W. Zipser and B. M. Watts, 1961, "Oxidative Rancidity in Cooked Mullet", Food Technology, 15:318). The anti-oxidant activity of sodium tripolyphosphate, however, is not effective for many types of foods. For example, and as stated in U.S. Pat. No. 3,875,313, sodium tripolyphosphate has very little effect on the oxidative instability of raw fatty fish. Sodium tripolyphosphate has little or no effect on the oxidative changes in raw salmon fish.

Lemon juice, which has a relatively high content of ascorbic acid and other natural anti-oxidants together with significant quantities of citric acid, has been known to exert an effective anti-oxidant stability and flavor imparting action in various foods such as fruits, vegetables and meat products (see, for example, U.S. Pat. No. 2,788,281, Guadagni, "Increasing the Flavor and Other Quantities of Foods", and U.S. Pat. No. 3,113 030, Brody, "Method of Preparing a Liquid Meat Product"). Lemon juice, however, has not achieved commercial importance in a number of potential applications because it is susceptible to attack by bacteria and, therefore, must be vacuum packaged or refrigerated, and being largely composed of water even in concentrated forms, it is relatively expensive to ship and to store. Lemon juice has been prepared in powdered form, but it has not become commercially available as an anti-oxidant in this form either, partly because of the possibility of the loss of anti-oxidant activity during the dehydration process (note U.S. Pat. No. 8,298,888, Villarreal, "Process for Preparing Soluble Citrus Fruit Powder", on the loss of ascorbic acid during dehydration of citrus fruit juice), and partly because the dehydration process is relatively expensive. In addition, large portions of inert ingredients such as dextrose are required to enhance the drying and storage properties.

Ascorbic acid, its isomer erythorbic acid, and their sodium salts also are known to be safe and beneficial additives for foods and they have been used in admixtures with sodium tripolyphosphate.

In U.S. Pat. No. 3,875,313 issued Apr. 1, 1975, there is disclosed a meat treatinq composition in dry, free-flowinq, homogeneous powder form comprising sodium tripolyphosphate hexahydrate in which the water of hydration contains lemon juice solids. Effective quantities of such hydrate can be employed in the treatment of meat, including poultry, red meat and fish, in order to maintain the color, taste and fresh quality of the meat throughout prolonged cold and frozen storage and throughout the thawing and cooking process.

By use of the hydration technique, sodium tripolyphosphate has been combined with a natural liquid product, lemon juice, so as to obtain a single composition that is a completely homogeneous, dry, free-flowing powder in which the components are physically inseparable. The uneven distribution and non-uniform treatment which would be expected from a mixture of small quantities of lemon juice solids and sodium tripolyphosphate has been eliminated. Hydration with the natural moisture in lemon juice, or lemon juice concentrate, locks the lemon juice solids in combination with the sodium tripolyphosphate in a uniform composition. Further, the expense and difficulty of handling the natural liquid product, and/or the expense and difficulty of reducing the natural liquid product to a dry concentrate, has been eliminated while retaining in the hydrate the benefit of each of the individual components. This patent exemplifies treating salmon steaks with sodium tripolyphosphate hydrated with lemon juice solids and storing frozen. This patent does not show the use of the composition in preventing bacterial deterioration of fish fillets.

BRIEF DESCRIPTION OF THE PRESENT INVENTION

In accordance with the present invention, it has been found that fish fillets can be storage and yield stabilized without using citric acid per se, and the flavor problems attendant with its use by means of a composition containing an alkali metal tripolyphosphate hydrated with lemon juice solids, an alkali metal acid pyrophosphate and a sorbate antimicrobial agent. The detailed amounts and methods of applying the material Will become more apparent from the following description.

The compositions of the present invention can stabilize fish fillets at sorbate levels significantly less than required by prior art compositions and without the use of citric acid per se. The composition of the invention provides effective bacterial, flavor, texture and appearance control at lower cost over that of the compositions of the prior art. The compositions of the invention are especially advantageous in treating fillets from high fat fish such as catfish.

DETAILED DESCRIPTION OF THE PRESENT INVENTION

As used herein, the term "alkali metal" is intended to encompass members of Group IA of the Periodic Table which form food grade compounds, particularly sodium and potassium.

The sodium tripolyphosphate-lemon juice hydrate composition as used in the invention may be prepared by hydrating anhydrous sodium tripolyphosphate with lemon juice, preferably in concentrated form. The hydration step is performed in such a way and in such proportion of sodium tripolyphosphate to lemon juice that the resulting product is a dry, free-flowing powder. The preparation of the lemon juice tripolyphosphate composition should be performed bearing in mind that tripolyphosphate forms a hexahydrate. Although more than six moles of water for each mole of tripolyphosphate may be present, since part of the water may be evaporated during the hydration process because of the heat of hydration, it is recommended that not more than about six moles of water (as part of the lemon juice or added separately) be present during the hydration process for each mole of anhydrous sodium tripolyphosphate. Ordinary lemon juice contains from about 90 to about 94% water (about 6 to about 10% solids). Commercial concentrated lemon juice will normally contain about 40 to about 65% water (about 35 to about 60% solids). For the hydration of sodium tripolyphosphate, it is preferred to use lemon juice containing about 63% water (about 37% solids) which has been diluted by the addition of at least half again as much water, up to an equal amount. Thus, the final lemon juice with which the sodium tripolyphosphate is hydrated and which is included in the term "lemon juice", preferably will contain from about 17% to about 38% lemon juice solids, and the balance water. However, any dry hydrate composition comprising sodium tripolyphosphate and lemon juice solids in a weight ratio of from about 7:1 to 70:1 may be used. Effective results are obtained usually by employing the hydrate in quantities ranging from about 40% to about 55% by weight of the total composition.

The composition of the present invention also contains an alkali metal acid pyrophosphate (an acidic compound as distinguished from the alkaline sodium pyrophosphate also known as tetrasodium pyrophosphate). The alkali metal acid pyrophosphate can be illustrated by sodium acid pyrophosphate and potassium acid pyrophosphate or mixtures thereof. Preferably, the sodium acid pyrophosphate is used though the potassium can be used if a low sodium diet is needed.

The sodium acid pyrophosphate is used in an amount sufficient to provide a treatment solution having an acid pH sufficient for effective sorbate use and preferably within the range of from about 5.5 to about 6.5. Preferably the pH is adjusted to a level approximating the natural pH of the treated substrate. The alkali metal acid pyrophosphate is preferably used in an amount ranging from about 40% to about 55% based on the total composition weight.

Also included in the composition of the invention is a sorbate food grade antimicrobial agent. Included within this class are sorbic acid and alkali metal sorbates such as sodium and, preferably, potassium sorbates and mixtures thereof.

The sorbate antimicrobial agent is used in an amount sufficient with the sodium tripolyphosphate hydrated with lemon juice solids and the sodium acid pyrophosphate to extend the shelf-life of the substrate over a control. The sorbate is preferably used in an amount of at least about 4%. The upper limit of the sorbate is dictated by economics and potential taste problems. Since the sorbate is one of the more expensive components of the composition, its use is desirably restricted to the minimum amount at which effective results are achieved. The sorbate is preferably used in an amount ranging from about 4% to about 8.5% based on the weight of the total composition.

The composition of the present invention can be prepared by dry blending the ingredients or by mixing the ingredients and drying them as desired. This dried composition can be stored until such time as needed for use. Also, the composition can be formed in situ in the treatment tank. The treatment solution can contain any other functional or functionally inert ingredients which have no detrimental effect on the functioning of the treatment solution of the invention. Such materials may include water, fats, oils, color, flavoring and the like. The preferred vehicle is water.

The composition of the invention is used in amounts sufficient to provide a solution having a solids content of the phosphate and sorbate composition ranging from 3 to 20% and preferably from about 8 to about 12% by weight based on the total weight of the solution. e.g. solvent and the phosphate and sorbate ingredients. The solution is in such concentration that the fish will pick up a sufficient amount of solution to provide the level of shelf-life control desired.

The solution can be applied to the surface of the fish fillet by conventional means including spraying, dipping and flooding or to the interior of the fillet by injection with a solution containing an effective amount of the treatment material composition or a combination of injection and surface treatment. The fillets can be flexed in the solution to improve absorption of the treating solution. The solution is applied to the fillet such that an amount effective to preserve and stabilize the fillet is absorbed. Dipping time is sufficient to cause fish take-up of such an effective amount and can be as short as 10 seconds to hours or longer. The time is reduced by flexing the fillet. Exact times may vary depending on the size of the fillet and species of fish. Concentrations and absorbence rates can be adjusted to meet any governmental requirements or limits.

The compositions of the present invention can be used to treat a wide variety of fish fillets. The compositions of the present invention are especially useful in treating high fat fish fillets such as those obtained from catfish, trout, tuna, salmon, halibut and the like. Low fat fish including sole, cod, flounder, perch, whitefish and the like, as well as fish that can be considered transitory between high and low fat such as bluefish, can also be effectively treated in accordance with the present invention. The compositions of the present invention provide stability to fish fillets for both rancidity degradation as well as putrefaction.

The invention is illustrated in the Examples which follow. As used in the Examples, flavor, texture and odor ere judged on a hedonic scale of 1 to 9 where 9 is the best unless otherwise stated. Yields are based on the initial weight at 100%. All percentages are by weight unless otherwise stated.

The following composition will be used in the Examples unless otherwise indicated.

TABLE I

TREATMENT AGENT USED IN EXAMPLES PERCENT TOTAL COMPOSITION

| | Examples 1 and 2 | Example 6 |
|---|---|---|
| Sodium tripolyphosphate hydrated With 3.7 lemon juice solids* (LOF) | 47% | 46.85% |
| Sodium Acid Pyrophosphate (SAPP) | 47% | 46.85% |
| Potassium Sorbate (SORB) | 6% | 6.3% |
| pH | | 6.35 |

*Available as Lem-O-Fos ™ phosphate from Stauffer Chemical Company.

In these Examples, taste test panel results were conducted on samples which were battered with a commercial mix (MODERN MAID All Purpose Batter) and breaded with a commercial breading mix (REDI-BREADER). The breaded fillets were fried at 176.7° C. (350° F.) for 3.5 minutes on one side and 2.5 minutes on the other. Corresponding portions of each fillet were evaluated for preference by the tasters.

Tasting was done by company personnel and part-time employees who are students in consumer type testing. Only a relatively small number of tasters was involved (4–8). The confidence limits for the data were not expected to be conclusive.

Standard plate counts were determined by an outside laboratory. One hundred gram fillet samples were blended with sterile water and 10 gram portions were diluted with phosphate buffer, pH 7.2. Blender jars were sterilized between samples with alcohol. Microbial incubation was conducted at 32° C. for 48 hours using AOAC techniques. Plate counts were reported as the numerical values or as logarithms in the Tables.

EXAMPLES 1 AND 2

Catfish fillets were purchased from a processing plant and treated shortly thereafter. A treating composition having the composition as set forth in TABLE I was dissolved at a 10% concentration. Fillets were individually weighed, flexed with excess treatment solution. for 1 minute each, drained and reweighed. Flexing was accomplished by forcing each side of the fillets to follow the contours of a bowl containing the treating solution. All fillets Were redipped once in the solution just before packaging to equalize the initial microbial load.

A composition as set forth in Table I was prepared at a 7% concentration. Two batches of catfish fillets each weighing 22.67 kilograms were weighed and injected with the solution. A Townsend ™ injector set to inject about 8–10% by weight solution based on the fillet weight was used. The fillets were drained and reweighed.

Treated fillets along with untreated controls were packed on polystyrene trays and overwrapped with a polyethylene wrap. Samples were stored on ice in an insulated box at 3.3° C. The controls were treated with water only. The samples were evaluated for yield, odor, appearance and flavor, as well as bacterial count.

Example 1 is listed in the following tables as "Injected" and Example 2 is listed as "Flexed".

TABLE II

| | % YIELD | |
|---|---|---|
| | Initial | After Storage at 3.33° C. |
| Injected | 108.8 | 105.6 |
| Flexed | 103.9 | 98.9 |
| Control | 100.0 | 98.7 |

TABLE III

MICROBIAL COUNTS - STORAGE AT 0° C.
STANDARD PLATE COUNT

| | Day 2 | Day 7 | Day 12 | Day 16 | Day 20 |
|---|---|---|---|---|---|
| Injected | $3.98 \times 10^4$ | $3.16 \times 10^5$ | $2.00 \times 10^7$ | $3.98 \times 10^8$ | $3.16 \times 10^8$ |
| Flexed | $6.31 \times 10^4$ | $1.26 \times 10^5$ | $1.00 \times 10^7$ | $1.58 \times 10^8$ | $3.16 \times 10^8$ |
| Control | $7.94 \times 10^4$ | $6.31 \times 10^5$ | $1.58 \times 10^8$ | $3.16 \times 10^8$ | $2.00 \times 10^8$ |

TABLE IV

MICROBIAL PLATE COUNTS - STORAGE AT 3.33° C.
STANDARD PLATE COUNTS

| | Day 2 | Day 4 | Day 8 | Day 12 |
|---|---|---|---|---|
| Injected | $3.98 \times 10^4$ | $1.00 \times 10^5$ | $1.58 \times 10^6$ | $3.16 \times 10^8$ |
| Flexed | $6.31 \times 10^4$ | $3.98 \times 10^4$ | $5.01 \times 10^6$ | $3.98 \times 10^8$ |
| Control | $7.94 \times 10^4$ | $7.94 \times 10^4$ | $6.31 \times 10^7$ | $5.01 \times 10^8$ |

TABLE V

FLAVOR OF STORED CATFISH FILLETS

| | Storage at 0° C. | | | | | Storage at 3.33° C. | | |
|---|---|---|---|---|---|---|---|---|
| Day | 1 | 7 | 13 | 17 | 21 | 7 | 10 | 13 |
| Injected | 8.3 | 5.4 | 5.0 | 6.6 | 8.0 | 6.2 | 5.5 | 6.5 |
| Flexed | 8.5 | 5.6 | 5.8 | 6.0 | 5.8 | 6.6 | 6.3 | 6.0 |
| Control | 7.5 | 5.4 | 4.3 | 4.0 | — | 5.4 | 5.5 | 2.3 |

TABLE VI

TEXTURE OF STORED CATFISH FILLETS

| | Storage at 0° C. | | | | | Storage at 3.33° C. | | |
|---|---|---|---|---|---|---|---|---|
| Day | 1 | 7 | 13 | 17 | 21 | 7 | 10 | 13 |
| Injected | 8.0 | 4.8 | 5.0 | 5.8 | 7.8 | 6.0 | 5.3 | 6.0 |
| Flexed | 8.3 | 5.6 | 5.8 | 7.0 | 6.0 | 5.8 | 6.5 | 5.5 |
| Control | 7.3 | 5.4 | 4.8 | 2.4 | — | 5.2 | 5.3 | 4.5 |

TABLE VII

ODOR OF STORED CATFISH FILLETS

| | Storage at 0° C. | | | Storage at 3.33° C. |
|---|---|---|---|---|
| Day | 13 | 17 | 21 | 13 |
| Injected | 4.6 | 6.5 | 6.0 | 4.3 |
| Flexed | 6.3 | 5.5 | 4.0 | 4.6 |
| Control | 3.6 | 2.0 | 1.0 | 3.3 |

Injected fillets achieved about twice the initial yield increase over flexed fillets (Table II) and maintained the yield advantage throughout storage. After an initial drop, storage yields remained constant with storage time and all storage yields were combined to obtain the average as shown in the table.

Microbial counts are summarized in Tables III and IV. Flexed samples had microbial counts somewhat lower than injected samples at 0° C. but not at 3.33° C. Both samples treated in accordance with the present invention showed inhibited microbial growth compared to the controls.

Flavor results shown in Table V indicate that samples prepared in accordance with the invention rated well for most of the evaluations. Injected and flexed treated samples maintained acceptable flavor in the catfish fillets for at least 21 days at 0° C., whereas control samples became unacceptable after 13 days.

Treated samples stored at 3.33° C. maintained quality shelf life for at least 13 days, whereas control samples became unacceptable after 10 days. Texture and odor ratings as shown in Tables VI and VII confirm the flavor ratings.

The results show that the compositions of the invention extend catfish fillet shelf life at least 8 days at 0° C., and at least 3 days at 3.33° C. in comparison to controls. Both injection and flexing methods of addition were found to be effective and give similar shelf Life extensions, though yields obtained with injection were higher. The compositions of the present invention retarded changes in microbial growth, flavor, texture and odor compared to the controls.

EXAMPLE 3

Two 22.7 kilogram batches of fresh catfish fillets were treated in a fish processing plant using a Baader Batch Treatment Machine. The treated composition was dissolved in cold water at a 10% solids concentration. Treatment solution was added to the machine in an amount of about 7% by weight of the fillets and the batch was agitated for one minute. Controls were prepared by a like agitation using only water. The treated fillets were drained, weighed and packed in styrofoam trays. The samples were held at either 0° C. or 2.8° C.

The samples were periodically evaluated for weight loss, microbial count and organoleptic changes using the procedures as in Example 1. The results obtained are reported in Tables VIII and IX:

TABLE VIII

CATFISH FILLETS MICROBIAL COUNTS AND YIELDS
STD PLATE COUNT (LOG)

| Stored at 0° C. | LOF/SAPP/SORB | Control |
|---|---|---|
| Day 2 | 5.08 | 6.61 |
| 7 | 5.62 | 8.28 |
| 12 | 7.61 | 7.76 |
| 16 | 8.26 | 8.08 |
| 21 | 8.56 | 10.36 |
| Stored at 2.8° C. | | |
| Day 4 | 5.26 | 5.65 |
| 8 | 7.79 | 8.04 |
| 12 | 7.76 | 7.76 |
| % Yield | | |
| Treatment[1] | 104.00 | 102.2 |
| Storage[2] | 100 | 98.4 |

[1]Average of two 22.7 kilogram batches.
[2]Average of 8 samples/treatment

TABLE IX
TASTE PANEL EVALUATION OF CATFISH[1]

| | LOF/SAPP/SORB | Control |
|---|---|---|
| Stored at 0° C. | | |
| *Flavor Summary* | | |
| Day 2 | 8.0 | 8.3 |
| 7 | 6.3 | 5.8 |
| 12 | 6.3 | 5.3 |
| 16 | 5.3 | 3.0 |
| 21 | 5.3 | — |
| *Texture Summary* | | |
| Day 2 | 7.3 | 7.7 |
| 7 | 5.3 | 5.8 |
| 12 | 5.9 | 5.9 |
| 16 | 5.6 | 4.7 |
| 21 | 5.7 | — |
| *Odor Summary* | | |
| Day 7 | 5.5 | 6.0 |
| 12 | 5.7 | 5.5 |
| 16 | 5.2 | 2.3 |
| 21 | 3.3 | 1.3 |
| Stored at 2.8° C. | | |
| *Flavor Summary* | | |
| Day 5 | 7.3 | 5.0 |
| 8 | 6.4 | 5.0 |
| 12 | 6.0 | 3.3 |
| *Texture Summary* | | |
| Day 5 | 6.1 | 5.4 |
| 8 | 6.6 | 4.6 |
| 12 | 4.8 | 3.6 |
| *Odor Summary* | | |
| Day 5 | 6.4 | 5.1 |
| 8 | 5.3 | 2.8 |
| 12 | 3.0 | 1.6 |

[1]Preference ratings use a 1-9 hedonic scale where 9 is most preferred.

The data in this Example show that fillets treated in accordance with the invention showed an increased yield initially over fillets treated with water and retained higher yields after storage up to 21 days. Since time and temperature of storage did not appreciably affect storage yields, the yield values at 0° C. and 2.8° C. were combined and reported as the average.

Microbial counts given in the Table show that control samples had generally higher counts than counts of fillets prepared in accordance with the invention at both temperatures.

Flavor results at 0° C. and at 2.8° C. inversely reflect the microbial results. Decreases in flavor ratings with storage time generally correspond to microbial increases with storage. The composition of the invention maintained acceptable flavors in fillets for 21 days whereas control samples became unacceptable (ratings below 5) after 12 days. Flavor ratings at 2.8° C. showed similar trends and indicated a shelf-life extension of about 4 days.

Odor scores for raw samples reflected the flavor scores. Panelists generally rated odor "neither like nor dislike" until near the end of the shelf-life period when some unpleasant odors became apparent. In this regard, an odor rating of "3" corresponds to a flavor rating of "5", and indicated the end of shelf-life.

The results show that catfish were readily treated in accordance with the invention under plant conditions using a commercially available mechanical unit. The yields and shelf-life extension achieved are consistent with previous results. Shelf-life can be extended to about 21 days at 0° C. and about 12 days at 2.8° C.

What is claimed is:

1. A composition for improving the shelf life of fish fillet comprising:
   (a) from about 40% to about 55% of an alkali metal tripolyphosphate hydrated with lemon juice solids;
   (b) alkali metal acid pyrophosphate in an amount ranging from about 55% to about 40%, said amount being sufficient to provide a treatment solution having a pH within the range of from about 5.5 to about 6.5; and
   (c) a sorbate antimicrobial agent in an amount ranging from about 4% to about 8.5%, said amount being sufficient with the alkali metal tripolyphosphate hydrated with lemon juice solids and the alkali metal acid pyrophosphate to extend the shelf life of the fillet over the life of untreated fish fillet; said percentages being based on the total dry weight of said composition.

2. The composition of claim 1 wherein said alkali metal tripolyphosphate is sodium tripolyphosphate.

3. The composition of claim 1 wherein said alkali metal acid pyrophosphate is sodium acid pyrophosphate.

4. The composition of claim 1 wherein said antimicrobial agent is selected from the group consisting of sorbic acid and alkali metal sorbates.

5. The composition of claim 1 wherein said antimicrobial agent is an alkali metal sorbate.

6. The composition of claim 5 wherein said alkali sorbate is potassium sorbate.

7. A fish fillet treating composition consisting essentially of from about 40% to about 55% sodium tripolyphosphate hydrated with lemon juice, from about 55% to about 40% sodium acid pyrophosphate and from about 4% to about 8.5% potassium sorbate, said sodium acid pyrophosphate being present in an amount sufficient to provide a treatment solution having a pH ranging from about 5.5 to about 6.5.

8. A stabilized fish fillet which comprises a fish fillet and a stabilizing effective amount of the composition of claim 1.

9. The stabilized fish fillet of claim 8 wherein said alkali metal tripolyphosphate is sodium tripolyphosphate.

10. The stabilized fish fillet of claim 8 wherein said alkali metal acid pyrophosphate is sodium acid pyrophosphate.

11. The stabilized fish fillet of claim 8 wherein said antimicrobial agent is selected from the group consisting of sorbic acid and alkali metal sorbates.

12. The stabilized fish fillet of claim 8 wherein said antimicrobial agent is an alkali metal sorbate.

13. The stabilized fish fillet of claim 12 wherein said alkali sorbate is potassium sorbate.

14. The stabilized fish fillet of claim 8 wherein the fish fillet is obtained from fish having a high fat content.

15. The stabilized fish fillet of claim 14 wherein the high fat fish are selected from the group consisting of catfish, trout, tuna, salmon and halibut.

16. The stabilized fish fillet of claim 15 wherein the high fat fish is catfish.

17. A stabilized fish fillet which comprises a fish fillet and a stabilizing effective amount of the composition of claim 7.

* * * * *